C. H. THAYER.
CLUTCH.
APPLICATION FILED MAY 10, 1913.
1,133,893.
Patented Mar. 30, 1915.
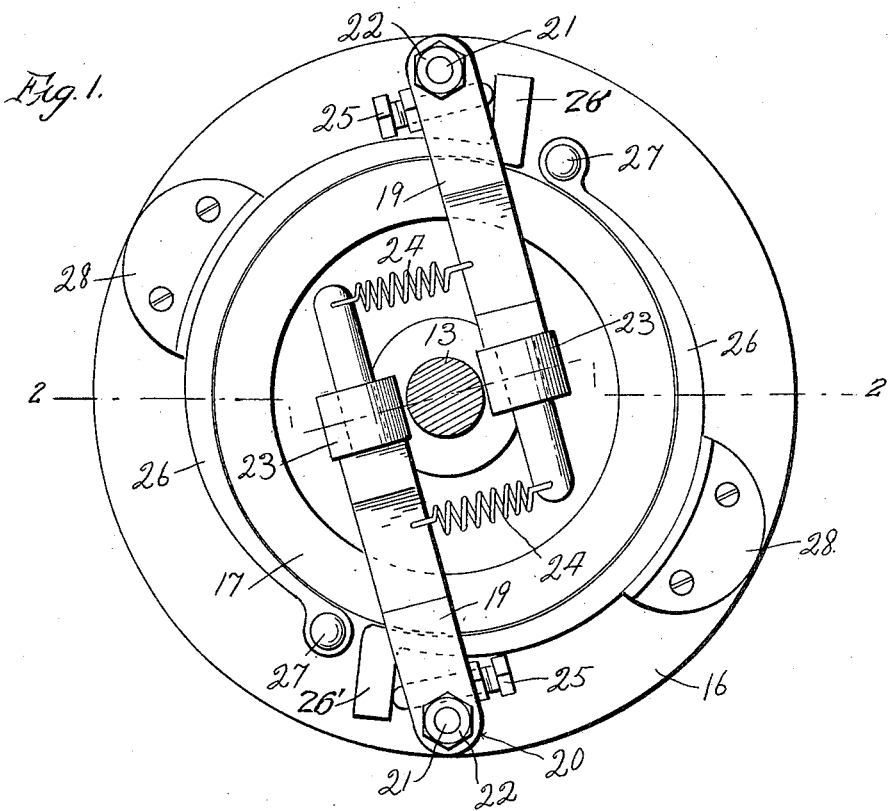
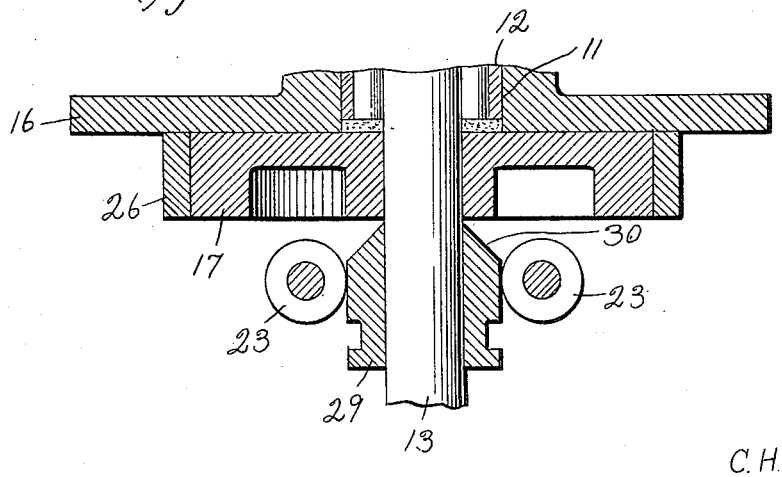
Witnesses
Robert M. Sutphen
A. S. Hind
Inventor
C. H. Thayer
By Watson E. Coleman
Attorney

UNITED STATES PATENT OFFICE.

CHARLES H. THAYER, OF ELMIRA, NEW YORK, ASSIGNOR OF ONE-THIRD TO GEORGE P. RANSOM AND ONE-THIRD TO GEORGE A. GUCKER, BOTH OF ELMIRA, NEW YORK.

CLUTCH.

1,133,893.   Specification of Letters Patent.   Patented Mar. 30, 1915.

Application filed May 10, 1913. Serial No. 766,861.

*To all whom it may concern:*

Be it known that I, CHARLES H. THAYER, citizen of the United States, residing at Elmira, in the county of Chemung and State of New York, have invented certain new and useful Improvements in Clutches, of which the following is a specification, reference being had to the accompanying drawing.

This invention relates to certain new and useful improvements in clutches and has for its primary object to provide a transmission clutch whereby gearing or other element may be temporarily and securely locked upon its shaft.

The invention has for a more particular object to provide a friction clutch embodying a clutch band fixed at one of its ends upon a driving element, and means for frictionally engaging the said band upon the periphery of the part to be driven, said means having an adjustable element engaging the band, whereby the frictional pressure of the same upon the driven part may be regulated.

The invention has for still another object to provide a friction clutch which is simple and inexpensive in its construction, strong and durable in practical use, and highly convenient in operation.

With the above and other objects in view, the invention consists in novel features of construction, combination and arrangement of parts as will be hereinafter referred to and more particularly pointed out in the specification and claim.

For a full understanding of the invention, reference is to be had to the following description and accompanying drawing, in which:

Figure 1 is a side elevation of my improved friction clutch, and Fig. 2 is a section taken on the line 2—2 of Fig. 1.

Referring in detail to the drawing 13 designates a driven shaft upon which a disk 17 is securely fixed. A disk 16 is formed upon the end of a driving shaft, (not shown), and the hub portion of said disk is provided with a chamber 11, in which a sleeve or bushing 12 is arranged. Between the inner wall of this bushing and the periphery of the driven shaft 13, suitable bearing rollers for said shaft are arranged. It is to be understood, however, that the present invention is not limited to this particular mounting and arrangement of the driving and driven parts.

Upon the face of the disk 16, which is of greater diameter than the disk 17, the outer ends of the levers 19 are mounted, said levers being provided with cylindrical bosses or extensions 20, which are loosely mounted upon the bolts 21 arranged in the disk 16 adjacent to its periphery. Nuts, 22, are threaded upon the ends of these bolts to retain the levers thereon. The levers 19 extend in tangential relation to the shaft 13, and are each provided with a roller 23, said rollers bearing upon opposite sides of the shaft 13. Coil springs 24 connect the levers 19 upon opposite sides of the shaft 13, and normally tend to hold the rollers 23 in engagement with said shaft and prevent an outward movement or expansion of the levers. Each of the levers 19 is provided adjacent its outer pivoted end with an adjusting screw 25, which bears against the outwardly extended end 26' of a clutch band 26, the other end of which is secured to the disk 16 as at 27. These clutch bands are each of substantially semicircular form and are constructed of spring steel. The free ends of said clutch bands are disposed between the levers 19 and the face of the disk 16.

28 designates stop or abutment plates which are fixed to the face of the disk 16 and limit the outward movement of the clutch bands. A collar 29 is loosely fitted upon the shaft 13 and provided with a beveled end face 30 for engagement with the inner ends of rollers 23 mounted upon the levers 19. It will be readily understood that when this collar is shifted upon the shaft 13, toward the disk 16, the beveled end face engages with the rollers 23 and the levers 19 are forced outwardly from the shaft in opposite directions. Thus the clutch bands 26 are frictionally engaged upon the periphery of the disk 17, and said disk locked to the disk 16 for rotation therewith. By simply adjusting the screws 25 in the levers 19 the frictional pressure of the bands upon the periphery of the disk 17 may be properly regulated.

From the foregoing description taken in connection with the accompanying drawing, the construction, manner of operation and several advantages of my improved friction clutch will be clearly and fully understood.

The clutch bands may be very easily and quickly applied so as to transmit power from the driving to the driven shaft. The several parts of the device are all of exceedingly simple form and in view of the compact arrangement thereof, it will be apparent that my invention may be employed with particular advantage upon power transmission gearing such as is employed for driving motor vehicles. The invention can also be produced at comparatively small manufacturing cost.

While I have above described the preferred form, construction and arrangement of the several parts employed, it will be understood that the device is susceptible of considerable modification therein, and I therefore reserve the privilege of resorting to all such legitimate changes as may be fairly embodied within the spirit and scope of the invention as claimed.

Having thus described the invention, what is claimed is:

The combination with driving and driven shafts, said driving shaft having a flange thereon, of a disk keyed upon the driven shaft, a clutch band secured at one of its ends upon said flange and having its other end outwardly extended, a lever pivotally mounted at its outer end upon said flange and carrying an adjustable screw intermediate of its ends acting against the outwardly extended end of the clutch band, a roller mounted upon the other end of the lever, a spring yieldably holding said lever against movement in a direction to frictionally engage the clutch band upon the periphery of the disk, and actuating means coöperating with said roller to move the lever and frictionally contract the band upon the periphery of the disk.

In testimony whereof I hereunto affix my signature in the presence of two witnesses.

CHARLES H. THAYER.

Witnesses:
WILBUR D. BLADES,
G. A. GUCKER.

Copies of this patent may be obtained for five cents each, by addressing the "Commissioner of Patents, Washington, D. C."